United States Patent
Mori et al.

(10) Patent No.: US 10,482,579 B2
(45) Date of Patent: Nov. 19, 2019

(54) IMAGE PROCESSING APPARATUS, IMAGE PROCESSING METHOD, AND ANALYZER

(71) Applicant: JEOL Ltd., Tokyo (JP)

(72) Inventors: Norihisa Mori, Tokyo (JP); Naoki Kato, Tokyo (JP)

(73) Assignee: JEOL Ltd., Tokyo (JP)

( * ) Notice: Subject to any disclaimer, the term of this patent is extended or adjusted under 35 U.S.C. 154(b) by 0 days.

(21) Appl. No.: 15/673,825

(22) Filed: Aug. 10, 2017

(65) Prior Publication Data
US 2018/0047138 A1    Feb. 15, 2018

(30) Foreign Application Priority Data
Aug. 12, 2016    (JP) .................................. 2016-158685

(51) Int. Cl.
*G06T 5/00*    (2006.01)
*G06T 5/10*    (2006.01)

(52) U.S. Cl.
CPC ................ *G06T 5/002* (2013.01); *G06T 5/10* (2013.01); *G06T 2207/10061* (2013.01); *G06T 2207/10116* (2013.01); *G06T 2207/20064* (2013.01)

(58) Field of Classification Search
CPC ........... G06T 5/002; G06T 2207/10061; G06T 2207/10116; G06T 2207/20064
See application file for complete search history.

(56) References Cited

U.S. PATENT DOCUMENTS

| | | | |
|---|---|---|---|
| 5,878,108 A * | 3/1999 | Baba .................... | A61B 6/5282 378/7 |
| 6,064,776 A * | 5/2000 | Kikuchi ................. | H04N 19/80 375/240.29 |
| 7,020,343 B1 * | 3/2006 | Avinash .................. | G06T 5/002 382/172 |
| 9,263,164 B2 * | 2/2016 | Goldammer ......... | A61B 6/4035 |
| 9,691,165 B2 * | 6/2017 | Bermano ............ | G06K 9/00604 |
| 2003/0185337 A1 * | 10/2003 | Hsieh .................... | G06T 11/005 378/4 |
| 2005/0105682 A1 * | 5/2005 | Heumann ............ | G01N 23/046 378/58 |
| 2008/0050030 A1 * | 2/2008 | Hara .................... | G06K 9/0008 382/254 |
| 2008/0193014 A1 * | 8/2008 | Ecker ................... | G06K 9/0014 382/173 |

(Continued)

FOREIGN PATENT DOCUMENTS

JP    20037245 A    1/2003

*Primary Examiner* — Mekonen T Bekele
(74) *Attorney, Agent, or Firm* — The Webb Law Firm

(57) ABSTRACT

Provided is an image processing apparatus, which is configured to perform smoothing processing on a mapping image obtained by detecting a signal emitted from one of a plurality of analysis areas of a specimen. The image processing apparatus includes: a memory; and a processor configured to execute a program stored in the memory to perform: processing for calculating a difference between a maximum value and a minimum value of signal intensity data being intensity information on the signal of one of pixels within the mapping image, and determining a degree of smoothing to be used for the smoothing processing based on the difference; and processing for performing the smoothing processing based on the determined degree of smoothing.

9 Claims, 8 Drawing Sheets

(56) References Cited

U.S. PATENT DOCUMENTS

| | | | |
|---|---|---|---|
| 2011/0206186 A1* | 8/2011 | Matsumura | G01N 23/223 378/87 |
| 2015/0083913 A1* | 3/2015 | Kinugasa | G01T 1/172 250/336.1 |
| 2015/0213582 A1* | 7/2015 | Kim | G06T 5/40 382/169 |
| 2015/0313558 A1* | 11/2015 | Melman | G21K 1/04 378/62 |
| 2016/0055636 A1* | 2/2016 | Khalil | A61B 5/726 424/85.2 |
| 2017/0346750 A1* | 11/2017 | Wang | H04L 1/1825 |
| 2018/0279457 A1* | 9/2018 | Miller | A61B 6/032 |

\* cited by examiner

IMAGE PROCESSING APPARATUS, IMAGE PROCESSING METHOD, AND ANALYZER

Japanese Patent Application No. 2016-158685, filed on Aug. 12, 2016, is hereby incorporated by reference in its entirety.

BACKGROUND OF THE INVENTION

The present invention relates to an image processing apparatus, an image processing method, and an analyzer.

There is known a method of obtaining a mapping image by scanning an electron beam or the like on a specimen and detecting a characteristic X-ray emitted from each area of the specimen through use of an energy-dispersive X-ray detector (EDS detector) or a wavelength-dispersive X-ray detector (WDS detector) (see, for example, Japanese Patent Application Laid-open No. 2003-7245).

The mapping image obtained in this manner may be subjected to smoothing processing in order to improve an S/N ratio. A method using a wavelet transform, a method using a moving average filter, and other such method are known as a method of performing the smoothing processing on the mapping image. In a case where the smoothing processing is performed on the mapping image through use of the wavelet transform, the moving average filter, or the like, image quality may deteriorate depending on an image when the smoothing is performed under a fixed condition. Therefore, in order to use those methods to perform the smoothing processing, a user needs to determine the condition (degree of smoothing) for the smoothing for each image.

As described above, the user hitherto determines the condition for the smoothing while viewing the mapping image in order to perform the smoothing processing on the mapping image.

However, when the user determines the condition for the smoothing, it may take the user much time to determine the condition, or the user may fail to find an optimal condition, which is burdensome to the user. There are also variations in determination of the condition for the smoothing depending on the user.

SUMMARY

The present invention can provide an image processing apparatus and an image processing method, which are capable of automatically determining a degree of smoothing to be used for smoothing processing on a mapping image. The present invention can also provide an analyzer including the above-mentioned image processing apparatus.

According to a first aspect of the present invention, there is provided an image processing apparatus, which is configured to perform smoothing processing on a mapping image obtained by detecting a signal emitted from one of a plurality of analysis areas of a specimen, the image processing apparatus including:

a memory; and a processor configured to execute a program stored in the memory to perform:

processing for calculating a difference between a maximum value and a minimum value of signal intensity data being intensity information on the signal of one of pixels within the mapping image, and determining a degree of smoothing to be used for the smoothing processing based on the difference; and processing for performing the smoothing processing based on the determined degree of smoothing.

According to a second aspect of the present invention, there is provided an image processing method for performing smoothing processing on a mapping image obtained by detecting a signal emitted from one of a plurality of analysis areas of a specimen, the image processing method including:

calculating a difference between a maximum value and a minimum value of signal intensity data being intensity information on the signal of one of pixels within the mapping image, and determining a degree of smoothing to be used for the smoothing processing based on the difference; and performing the smoothing processing based on the determined degree of smoothing.

According to a third aspect of the present invention, there is provided an analyzer including the above-mentioned image processing apparatus.

Figure 1:
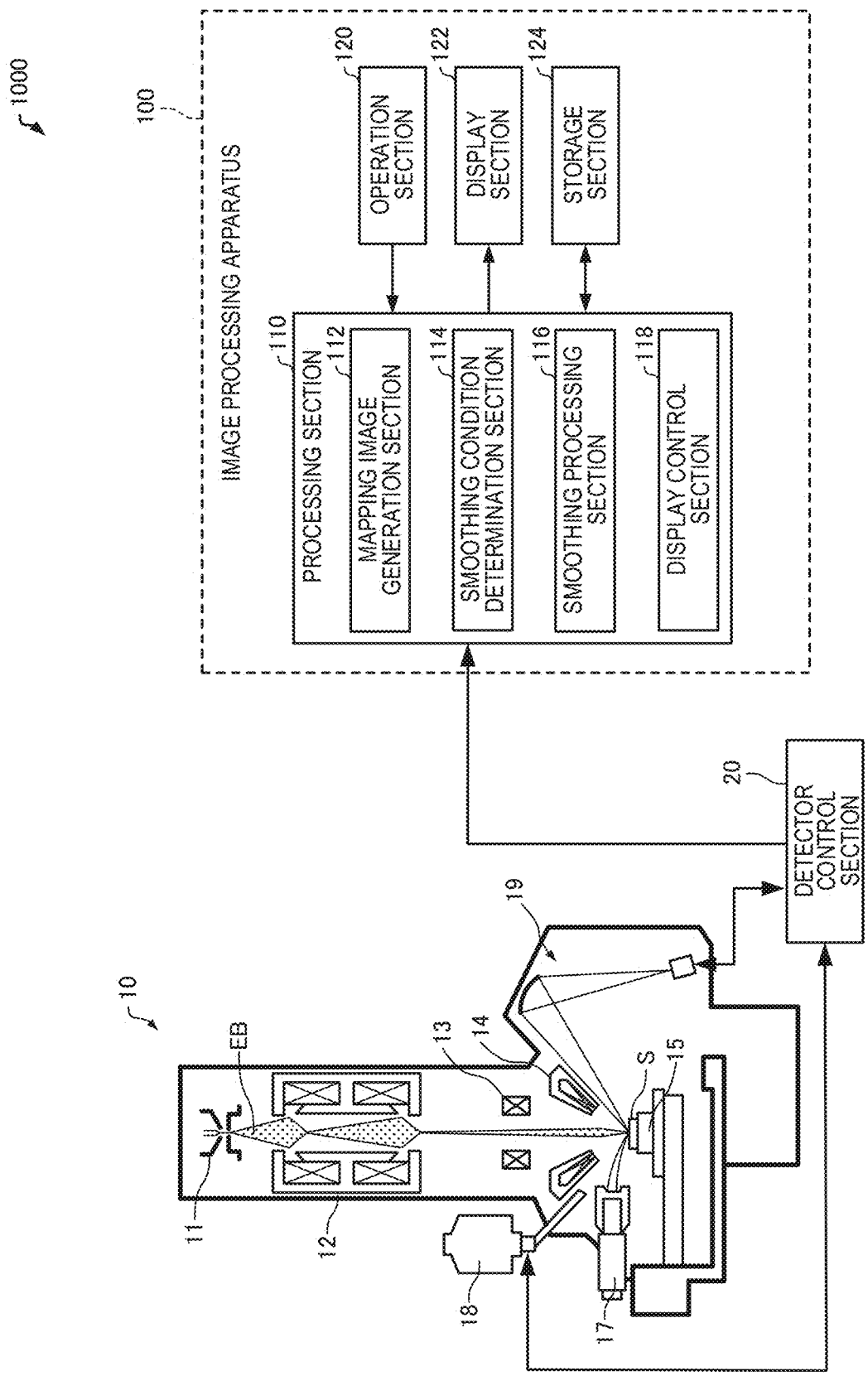
FIG. 1 is a diagram for illustrating a configuration of an image processing apparatus according to a first embodiment of the present invention.

DETAILED DESCRIPTION OF THE EMBODIMENT (1) According to one embodiment of the present invention, there is provided an image processing apparatus, which is configured to perform smoothing processing on a mapping image obtained by detecting a signal emitted from one of a plurality of analysis areas of a specimen, the image processing apparatus including:

a memory; and a processor configured to execute a program stored in the memory to perform:

processing for calculating a difference between a maximum value and a minimum value of signal intensity data being intensity information on the signal of one of pixels within the mapping image, and determining a degree of smoothing to be used for the smoothing processing based on the difference; and processing for performing the smoothing processing based on the determined degree of smoothing.

With the above-mentioned image processing apparatus, the degree of smoothing to be used for the smoothing processing on the mapping image is determined based on the difference between the maximum value and the minimum value of the signal intensity data, and hence the degree of smoothing can be automatically determined. Therefore, according to the above-mentioned image processing apparatus, a user does not need to determine the degree of smoothing, which can improve an appearance of the mapping image with ease.

In addition, with the above-mentioned image processing apparatus, for example, errors corresponding to statistical variations during measurement of a signal can be kept within one color tone by determining the degree of smoothing based on the difference between the maximum value and the minimum value of the signal intensity data, and hence it is possible to obtain a smooth mapping image having a satisfactory appearance.

(2) In the image processing apparatus, the processing for determining the degree of smoothing may include processing for calculating a magnitude of variations in the signal intensity data within the mapping image, and determining the degree of smoothing based on the difference and the magnitude of variations in the signal intensity data.

With the above-mentioned image processing apparatus, the degree of smoothing can be determined in consideration of the magnitude of variations in the signal intensity data, and hence it is possible to obtain the mapping image having a more satisfactory appearance.

(3) In the image processing apparatus, the magnitude of variations in the signal intensity data may be a magnitude of a coefficient of variation in the signal intensity data.

(4) In the image processing apparatus, the processing for performing the smoothing processing may include processing for performing the smoothing processing through use of a wavelet transform.

(5) In the image processing apparatus:

the processing for determining the degree of smoothing may include processing for calculating a minimum value of a filter size D that satisfies the following expression; and the processing for performing the smoothing processing may include processing for performing the smoothing processing through use of one of a moving average filter and a Gaussian filter that use the minimum value of the filter size D as a filter size:

$$D > \frac{1}{A\sqrt{H}}$$

where A represents a given constant, and H represents the difference between the maximum value and the minimum value of the signal intensity data.

(6) In the image processing apparatus:

the processing for determining the degree of smoothing may include processing for calculating a minimum value of a filter size D that satisfies the following expression; and the processing for performing the smoothing processing may include processing for performing the smoothing processing through use of one of a moving average filter and a Gaussian filter that use the minimum value of the filter size D as a filter size:

$$D > \frac{1}{A\sqrt{H \times C}}$$

where A represents a given constant, H represents the difference between the maximum value and the minimum value of the signal intensity data, and C represents a coefficient of variation in the signal intensity data.

(7) In the image processing apparatus:

the processing for determining the degree of smoothing may include processing for calculating a size of one of the analysis areas, and determining the degree of smoothing based on the size of one of the analysis areas; and the processing for performing the smoothing processing may include processing for performing the smoothing processing based on the degree of smoothing determined based on the difference and the degree of smoothing determined based on the size of one of the analysis areas.

With the above-mentioned image processing apparatus, the degree of smoothing can be determined in consideration of the size of one of the analysis areas in addition to the errors corresponding to the statistical variations during the measurement of the signal, and hence it is possible to obtain the mapping image having a more satisfactory appearance.

(8) In the image processing apparatus, the processing for determining the degree of smoothing may include processing for calculating the size of one of the analysis areas through use of the following expression:

$$DE = Z + \sqrt{d^2 + S^2}$$

where DE represents the size of one of the analysis areas, Z represents a size of a generation area of the signal, d represents a diameter of a probe for causing the signal to be generated from the generation area, and S represents a size of the mapping image per pixel.

(9) In the image processing apparatus:

the signal may be a characteristic X-ray; and the characteristic X-ray may be detected by one of a wavelength-dispersive X-ray detector and an energy-dispersive X-ray detector.

(10) According to one embodiment of the present invention, there is provided an image processing method for performing smoothing processing on a mapping image obtained by detecting a signal emitted from one of a plurality of analysis areas of a specimen, the image processing method including:

calculating a difference between a maximum value and a minimum value of signal intensity data being intensity information on the signal of one of pixels within the mapping image, and determining a degree of smoothing to be used for the smoothing processing based on the difference; and performing the smoothing processing based on the determined degree of smoothing.

(11) According to one embodiment of the present invention, there is provided an analyzer including the image processing apparatus.

With the above-mentioned analyzer including the image processing apparatus according to the one embodiment, the smoothing processing can be automatically performed on the measured mapping image.

Exemplary embodiments of the present invention are described in detail below with reference to the drawings. Note that the following exemplary embodiments do not unduly limit the scope of the present invention as stated in the appended claims. Note also that all of the elements described below should not necessarily be taken as essential elements of the present invention.

1. First Embodiment 1.1. Configuration

An image processing apparatus according to a first embodiment of the present invention is described below with reference to the drawings. FIG. 1 is a diagram for illustrating a configuration of an image processing apparatus 100 according to the first embodiment. In FIG. 1, the description is directed to a case in which the image processing apparatus 100 is included in an analyzer 1000.

As illustrated in FIG. 1, the analyzer 1000 includes an analyzer main body 10 and the image processing apparatus 100.

The analyzer 1000 applies an electron beam EB to a specimen S, and detects characteristic X-rays generated from the specimen S upon application of the electron beam EB to analyze the specimen S. The analyzer 1000 can perform mapping analysis (area analysis) on the specimen S. The analyzer 1000 is an electron probe microanalyzer (EPMA), for example.

(1) Analyzer Main Body

The analyzer main body 10 includes an electron gun 11, a condenser lens 12, a deflector 13, an objective lens 14, a specimen stage 15, a secondary electron detector 17, an energy-dispersive X-ray detector 18, and a wavelength-dispersive X-ray detector 19.

The electron gun 11 generates the electron beam EB. The electron gun 11 emits toward the specimen S the electron beam EB that have been accelerated by applying a predetermined accelerating voltage.

The condenser lens 12 is disposed in the subsequent stage of the electron gun 11 (on the downstream side of the electron beam EB). The condenser lens 12 focuses the electron beam EB.

The deflector 13 is disposed in the subsequent stage of the condenser lens 12. The deflector 13 deflects the electron beam EB. A scan signal is input to the deflector 13 through a control circuit (not illustrated), and thus the electron beam EB that have been focused by the condenser lens 12 and the objective lens 14 can be scanned on the specimen S.

The objective lens 14 is disposed in the subsequent stage of the deflector 13. The objective lens 14 focuses the electron beam EB to apply the electron beam EB to the specimen S.

The specimen stage 15 can support the specimen S. The specimen S is placed on the specimen stage 15. The specimen stage 15 can be moved by a stage-moving mechanism (not illustrated) that includes a drive source, for example, a motor.

The secondary electron detector 17 detects secondary electrons released from the specimen S. The secondary electron detector 17 is, for example, an Everhart-Thornley detector (ET detector). A signal output from the secondary electron detector 17 is stored in a storage section 124 in synchronization with the scan signal for the electron beam EB. With this configuration, a secondary electron image (SEM image) can be obtained.

The energy-dispersive X-ray detector 18 discriminates X-rays based on energy to obtain a spectrum. The energy-dispersive X-ray detector 18 detects the characteristic X-rays that are generated from the specimen S by applying the electron beam EB to the specimen S.

The wavelength-dispersive X-ray detector 19 separates and detects the characteristic X-rays that are generated from the specimen S. The wavelength-dispersive X-ray detector 19 separates and detects X-rays having a specific wavelength by utilizing Bragg reflection of X-rays due to an analyzing crystal, for example.

A detector control section 20 counts signals output from the energy-dispersive X-ray detector 18 for the energy of each X-ray, to thereby generate X-ray intensity data. The detector control section 20 also counts signals output from the wavelength-dispersive X-ray detector 19 for the energy of each X-ray, to thereby generate X-ray intensity data. The detector control section 20 outputs the X-ray intensity data to the image processing apparatus 100.

The analyzer main body 10 can perform mapping analysis (area analysis) on the specimen S. Specifically, the analyzer main body 10 divides a predetermined range of the specimen S into predetermined analysis areas, and measures the X-ray intensity at each analysis area using the energy-dispersive X-ray detector 18 or the wavelength-dispersive X-ray detector 19 to obtain X-ray intensity map data.

The X-ray intensity map data includes two-dimensional distribution information on an element. The X-ray intensity map data includes information on a two-dimensional position (coordinates) of an element and the X-ray intensity at each position. The X-ray intensity map data is obtained on an element basis. For example, the X-ray intensity map data that represents an element "X" includes the two-dimensional distribution information on the element "X", and includes position information and information on the X-ray intensity of the element "X" at each position. The X-ray intensity map data output from the analyzer main body 10 is stored in the storage section 124 included in the image processing apparatus 100, for example.

(2) Image Processing Apparatus

The image processing apparatus 100 acquires X-ray intensity map data, which is obtained as a result of mapping analysis performed by the analyzer main body 10, to generate the mapping image. The mapping image may be a mapping image generated based on the signals output from the energy-dispersive X-ray detector 18, or may be a mapping image generated based on the signals output from the wavelength-dispersive X-ray detector 19.

The image processing apparatus 100 performs the smoothing processing on the generated mapping image, and displays the mapping image on a display section 122. The image processing apparatus 100 can be implemented by a personal computer (PC), for example. The image processing apparatus 100 includes a processing section (processor) 110, an operation section 120, the display section 122, and the storage section (memory) 124.

The operation section 120 acquires an operation signal that corresponds to the operation performed by the user, and transmits the operation signal to the processing section 110. The operation section 120 is a button, a key, a touch panel display, or a microphone, for example.

The display section 122 displays an image generated by the processing section 110. The function of the display section 122 may be implemented by an LCD, a CRT, or the like.

The storage section 124 stores a program, data, and the like that cause or allow the processing section 110 to perform various types of calculation processing and control processing. The storage section 124 is used as a work area for the processing section 110, and is also used to temporarily store the results of calculations performed by the processing section 110 in accordance with various programs, for example. The function of the storage section 124 may be implemented by a hard disk drive, a RAM, or other such memory.

The processing section 110 performs processing for generating the mapping image, processing for determining a condition for smoothing the mapping image, processing for smoothing the mapping image, and processing for displaying the mapping image on the display section 122. The function of the processing section 110 may be implemented by executing a program by various processors (e.g., CPUs). The processing section 110 includes a mapping image generation section 112, a smoothing condition determination section 114, a smoothing processing section 116, and a display control section 118.

The mapping image generation section 112 generates the mapping image based on the X-ray intensity map data acquired from the analyzer main body 10. The mapping image is an image including two-dimensional elemental distribution information, and includes X-ray intensity information (X-ray intensity data) on each of pixels that form the mapping image.

The smoothing condition determination section 114 performs processing for determining the degree of smoothing to be used for the smoothing processing on the mapping image.

The smoothing processing section 116 performs the smoothing processing on the mapping image based on the degree of smoothing determined by the smoothing condition determination section 114.

The display control section 118 controls the display section 122 to display the mapping image smoothed by the smoothing processing section 116.

1.2. Image Processing Method

Next, an image processing method (smoothing processing) performed by the image processing apparatus 100 is described.

Figure 2:
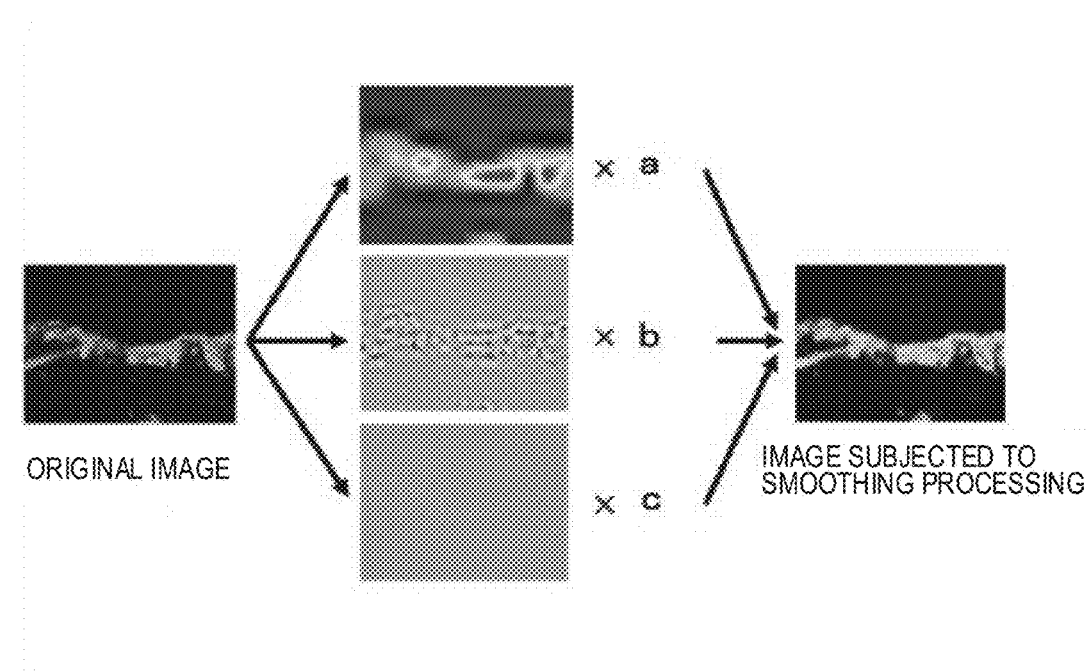
FIG. 2 is a diagram for illustrating a method for smoothing processing.

First, a method for the smoothing processing performed by the image processing apparatus 100 is described. FIG. 2 is a diagram for illustrating the method for the smoothing processing.

The image processing apparatus 100 performs the smoothing processing on the mapping image through use of a wavelet transform. In the smoothing processing using the wavelet transform, the image is frequency-converted by the wavelet transform, and respective frequency components are weighted and combined. Low-frequency components mainly include an overall structure of the image, and high-frequency components include edges and noises.

Table 1 is a table for illustrating an example of a weight to be given to each frequency component.

TABLE 1

| Frequency component | Weight parameter |
| --- | --- |
| Level 1 | a |
| Level 2 | b |
| Level 3 | c |

In Table 1, the level represents separated frequency components, level 1 represents a low-frequency component, level 3 represents a high-frequency component, and level 2 represents a frequency component between level 1 and level 3.

In addition, a, b, and c each represent a positive number equal to or smaller than 1, and have a relationship of a>b>c. The degree of smoothing becomes smaller (that is, the mapping image becomes closer to the original image) as the weight parameter becomes larger (closer to 1). In other words, the degree of smoothing becomes larger as the weight parameter becomes smaller.

A plurality of sets of such weight parameters as shown in Table 1 are provided in advance, and as illustrated in FIG. 2, the weight parameters (a, b, and c) corresponding to image quality of an original image are used to perform the smoothing. For example, the degree of smoothing is increased when noises are conspicuous in the original image, and the degree of smoothing is reduced when the original image has satisfactory image quality. With this configuration, an appropriate image is obtained.

In this case, an evaluation value SE for evaluating the image quality of the original image is expressed as Expression (a).

$$SE = H \times C \qquad (a)$$

In Expression (a), H represents an amplitude of the X-ray intensity data, and C represents a coefficient of variation (CV value; (standard deviation)/(average value)).

In this case, the amplitude H of the X-ray intensity data is used for evaluating statistical variations of the X-ray intensity data within the mapping image, and indicates a difference between the maximum value and the minimum value of the X-ray intensity data. The maximum value and the minimum value of the X-ray intensity data may be the maximum value and the minimum value of so-called raw data of the X-ray intensity data on all pixels that form the mapping image, or may be the maximum value and the minimum value of data obtained after smoothing or other such processing has been performed on the X-ray intensity data on all the pixels and a noise component has been removed therefrom.

Now, a reason that the degree of smoothing can be determined through use of the evaluation value SE is described below.

First, the amplitude H is described.

The amplitude H is used for evaluating the statistical variations of the X-ray intensity data. An image having a smaller amplitude H exhibits relatively larger statistical variations, and an image having a larger amplitude H exhibits relatively smaller statistical variations.

Figure 3:
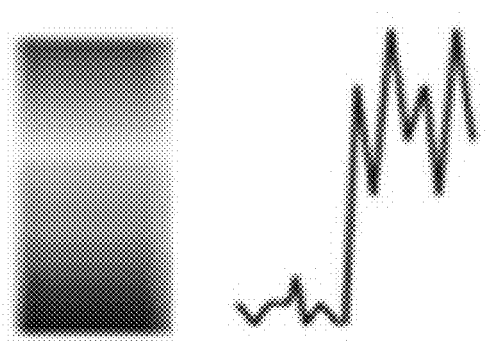
FIG. 3 is a diagram for illustrating an example of a profile of an X-ray intensity having an amplitude of 16.
Figure 4:
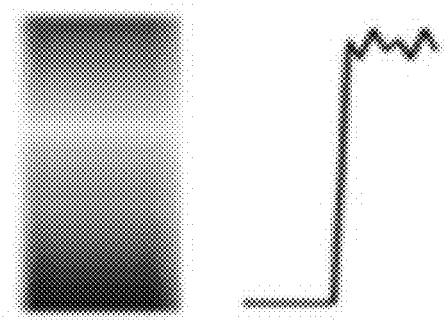
FIG. 4 is a diagram for illustrating an example of a profile of an X-ray intensity having an amplitude of 256.

FIG. 3 is a diagram for illustrating an example of a profile of the X-ray intensity having an amplitude H of 16 (difference between the maximum value and the minimum value of the X-ray intensity data is 16 counts). FIG. 4 is a diagram for illustrating an example of a profile of the X-ray intensity having an amplitude H of 256 (difference between the maximum value and the minimum value of the X-ray intensity data is 256 counts).

In general, the mapping image is expressed in pseudo color of 16 levels of gray. The X-ray intensity data having the amplitude H of 16, which is illustrated in FIG. 3, exhibits relatively larger statistical variations ($4/16 = 1/4$), and errors corresponding to statistical variations cover different color tones. This causes the mapping image to become a rough image exhibiting a large number of noises. Therefore, the degree of smoothing needs to be increased for such a mapping image.

Meanwhile, the X-ray intensity data having the amplitude H of 256, which is illustrated in FIG. 4, exhibits relatively smaller statistical variations ($16/256 = 1/16$), and the errors corresponding to the statistical variations are kept within one color tone. This causes the mapping image to become a smooth image having a satisfactory appearance. Therefore, it is not necessary to perform the smoothing on the mapping image (or the degree of smoothing may be small).

In this manner, smoothing conditions (presence or absence of the smoothing processing and strength of the smoothing) depend on the amplitude H of the original image.

Figure 5:
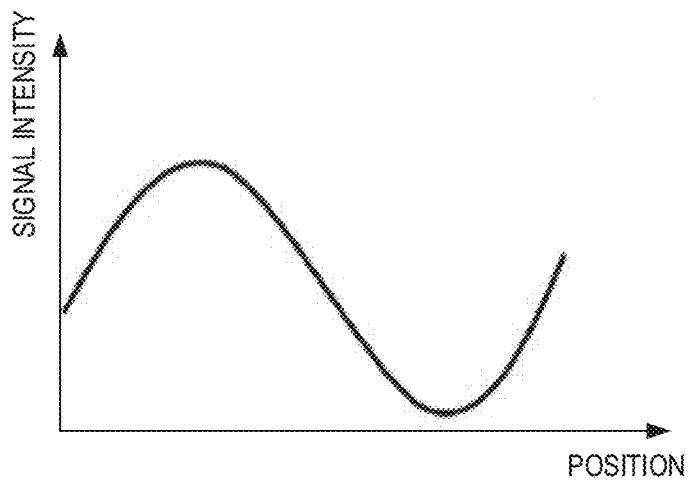
FIG. 5 is a graph for illustrating a relationship between a coefficient of variation and the X-ray intensity.
Figure 6:
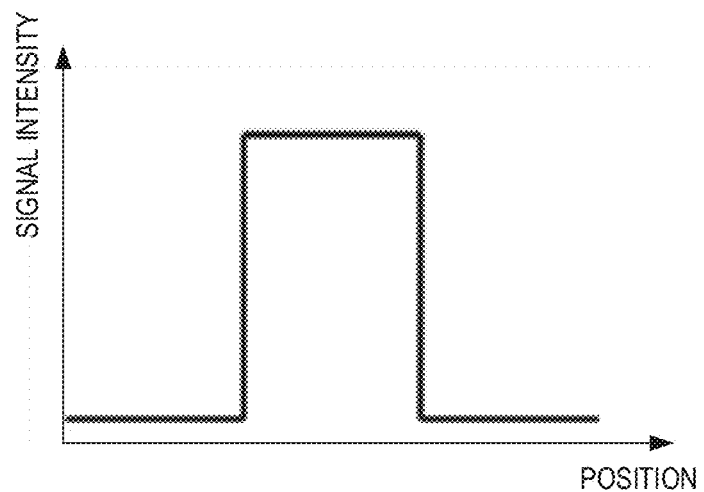
FIG. 6 is a graph for illustrating a relationship between the coefficient of variation and the X-ray intensity.

Next, a coefficient C of variation is described. FIG. 5 and FIG. 6 are graphs for illustrating relationships between the coefficient C of variation and the X-ray intensity. A case in which the coefficient C of variation is small is illustrated in FIG. 5, and a case in which the coefficient C of variation is large is illustrated in FIG. 6.

The coefficient C of variation (CV value) is used for evaluating a distribution state of the X-ray intensity within the image. When the coefficient C of variation is small, there are few locations at which the X-ray intensity steeply changes within the image, and a uniform X-ray intensity is exhibited within the image. When the coefficient C of variation is large, it is indicated that there are large variations in X-ray intensity within the image and that there is an edge part in which the X-ray intensity steeply changes. For example, the mapping image of a two-phase structure of a metal material or other such mapping image including a plurality of phases that are greatly different in composition exhibits a large coefficient C of variation.

When the coefficient C of variation is small, the degree of smoothing may be increased for the mapping image, but when the coefficient C of variation is large, it is preferred to reduce the degree of smoothing (or it is preferred to avoid performing the smoothing) in order to maintain a clear boundary at the edge within the image.

In this manner, the smoothing conditions (presence or absence of the smoothing processing and strength of the smoothing) depend also on the coefficient C of variation of the original image.

The weight parameter is given to each evaluation value SE as shown in, for example, Table 2.

TABLE 2

| Frequency component | 0 ≤ SE ≤ 4 | 4 < SE ≤ 16 | 16 < SE ≤ 256 |
|---|---|---|---|
| Level 1 | a | a | a |
| Level 2 | b | a | a |
| Level 3 | c | b | a |

The weight parameter of the evaluation value SE is set so that the statistical variations of the X-ray intensity data within the image subjected to the smoothing processing become relatively smaller. For example, when the mapping image is expressed in pseudo color of 16 levels of gray, the weight parameter is set so that the statistical variations of the X-ray intensity data within the mapping image subjected to the image processing become equal to or smaller than $1/16$.

In addition to the evaluation value SE for evaluating the image quality of the original image, an evaluation value DE corresponding to the size of the analysis area is used as the evaluation value for determining the degree of smoothing.

Now, the evaluation value DE is described below.

The evaluation value DE is expressed as Expression (b).

$$DE = Z + \sqrt{d^2 + S^2} \quad (b)$$

Figure 7:
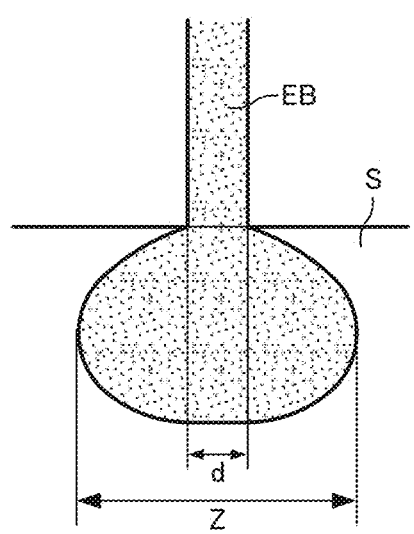
FIG. 7 is a diagram for illustrating a generation area of the X-ray and a diameter of a probe.

In Expression (b), Z represents the size (width) of a generation area of the X-ray, and d represents a radius of a probe (electron beam) for causing the X-ray to be generated from the generation area as illustrated in FIG. 7. In addition, S represents a size of the mapping image per pixel.

As described above, the evaluation value DE is determined based on the size Z of the generation area of the X-ray, the probe diameter d, and the size S per pixel. Those values can be obtained from analytical conditions (apparatus conditions) for acquiring the mapping image and a material of the specimen S.

Specifically, the size Z of the generation area of the X-ray is a value obtained from an accelerating voltage and a material of a specimen to be analyzed. The probe diameter d is a value obtained from the accelerating voltage and a probe current. The size S per pixel is a value set freely by the user when the analytical conditions are set.

In the case of any one of the values, as the numerical value becomes smaller, a sharper mapping image having a higher spatial resolution is obtained, and as the numerical value becomes larger, a more blurred mapping image having a lower spatial resolution is obtained. That is, as the evaluation value DE becomes smaller, a mapping image having a higher spatial resolution is obtained, and as the evaluation value DE becomes larger, a mapping image having a lower spatial resolution is obtained.

To be more accurate, when the size Z of the generation area of the X-ray is large, the spatial resolution of the mapping image is not changed even by reducing the probe diameter d and the size S per pixel, but when the size Z of the generation area of the X-ray is small, the mapping image having a higher spatial resolution is obtained as the probe diameter d and the size S per pixel becomes smaller.

In the mapping image having a low spatial resolution, the analysis area often exceeds the size of one pixel. In this case, a result obtained as the X-ray intensity of one pixel does not accurately reflect the X-ray intensity corresponding to the size of the pixel, which means that the mapping image corresponding to pixels included in the analysis area may be smoothed. In short, the degree of smoothing is increased (that is, the smoothing is performed with a wider range) as the evaluation value DE becomes larger.

Meanwhile, in the mapping image having a high spatial resolution, the X-ray intensity of each pixel of the mapping image accurately reflects information on the specimen, and hence it is preferred not to perform the smoothing (or the degree of smoothing may be small). In short, the degree of smoothing is reduced as the evaluation value DE becomes smaller.

In this manner, the smoothing conditions depend also on the evaluation value DE.

The weight parameter is given to each evaluation value DE as shown in, for example, Table 3.

TABLE 3

| Frequency component | 0 ≤ DE ≤ 4 | 4 < DE ≤ 16 | 16 < DE ≤ 256 |
|---|---|---|---|
| Level 1 | d | d | d |
| Level 2 | d | e | e |
| Level 3 | d | e | f |

In Table 3, d, e, and f each represent a positive number equal to or smaller than 1, and have a relationship of d>e>f. The degree of smoothing becomes smaller (that is, the mapping image becomes closer to the original image) as the weight parameter becomes larger (closer to 1).

As illustrated in Table 3, the weight parameter of the evaluation value DE is set so that the degree of smoothing becomes smaller (that is, a range for executing the smoothing becomes narrower) as the evaluation value DE becomes smaller. In other words, the weight parameter of the evaluation value DE is set so that the degree of smoothing becomes larger (that is, the range for executing the smoothing becomes wider) as the evaluation value DE becomes larger. At this time, the weight parameter is set so that the range for executing the smoothing corresponds to the analysis area.

Next, processing performed by the processing section 110 of the image processing apparatus 100 is described.

Figure 8:
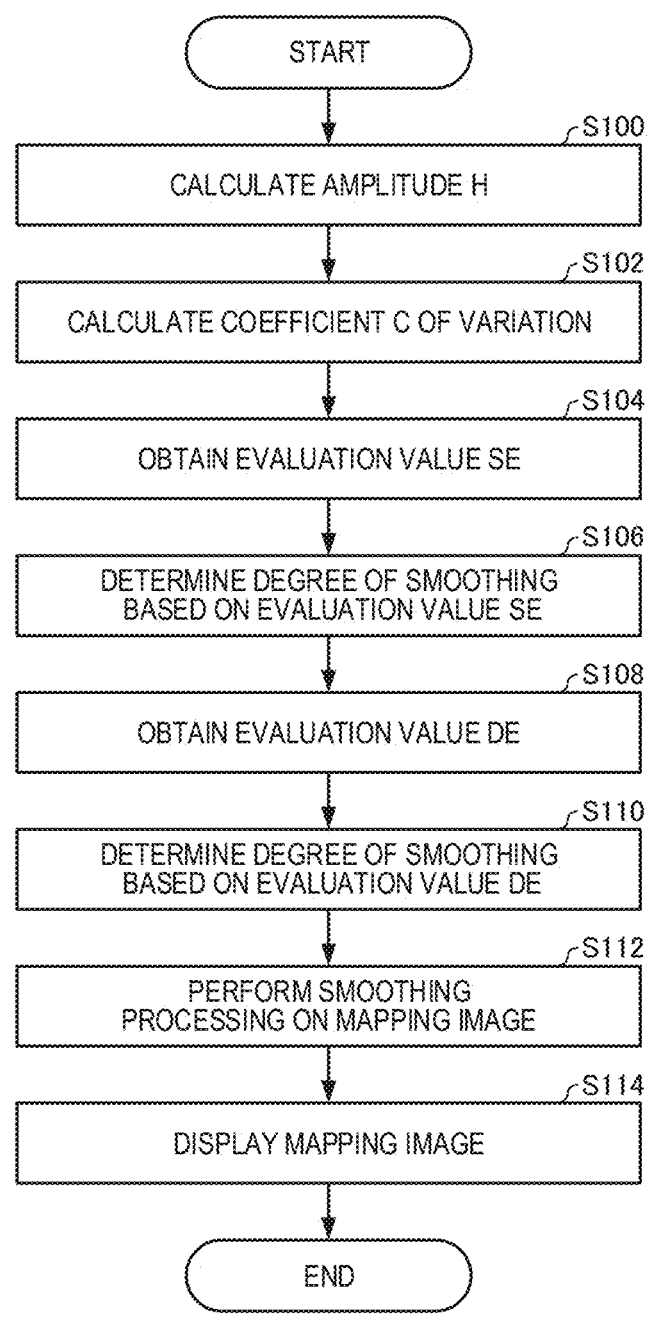
FIG. 8 is a flowchart for illustrating an example of processing performed by a processing section of the image processing apparatus according to the first embodiment.

FIG. 8 is a flowchart for illustrating an example of the processing performed by the processing section 110 of the image processing apparatus 100 according to the first embodiment.

The image processing apparatus 100 acquires the mapping image (X-ray intensity map data).

First, the smoothing condition determination section 114 extracts the maximum value and the minimum value from the X-ray intensity data on all the pixels of the mapping image, and calculates the difference between the maximum value and the minimum value that have been extracted to obtain the amplitude H (Step S100).

Subsequently, the smoothing condition determination section 114 calculates the coefficient C of variation for the X-ray intensity data on all the pixels of the mapping image (Step S102).

Subsequently, the smoothing condition determination section 114 multiplies the amplitude H by the coefficient C of variation to calculate the evaluation value SE (Step S104).

Subsequently, the smoothing condition determination section 114 determines the degree of smoothing based on the evaluation value SE (that is, the result of multiplying the amplitude H by the coefficient C of variation) (Step S106). Specifically, the smoothing condition determination section 114 selects the weight parameter corresponding to the obtained value of the evaluation value SE from among the weight parameters of the respective evaluation values SE shown in Table 2. Information on the weight parameters of the respective evaluation values SE shown in Table 2 is recorded in the storage section 124 in advance.

Subsequently, the smoothing condition determination section 114 obtains the evaluation value DE (that is, the size of the analysis area) (Step S108). Specifically, the smoothing condition determination section 114 acquires the analytical conditions (apparatus conditions) for acquiring the mapping image and information on the material of the specimen to be analyzed, and obtains the evaluation value DE through use of Expression (b). The analytical conditions and the information on the material of the specimen to be analyzed are stored in the storage section 124 in advance, and the smoothing condition determination section 114 reads those pieces of information stored in the storage section 124 to acquire the information.

Subsequently, the smoothing condition determination section 114 determines the degree of smoothing based on the evaluation value DE (Step S110). Specifically, the smoothing condition determination section 114 selects the weight parameter corresponding to the obtained value of the evaluation value DE from among the weight parameters of the respective evaluation values DE shown in Table 3. Information on the weight parameters of the respective evaluation values DE shown in Table 3 is recorded in the storage section 124 in advance.

Subsequently, the smoothing processing section 116 performs the smoothing processing on the mapping image based on the degree of smoothing (weight parameter) determined based on the evaluation value SE and the degree of smoothing (the weight parameter) determined based on the evaluation value DE (Step S112).

Specifically, the smoothing processing section 116 frequency-converts the mapping image by the wavelet transform, and multiplies the respective frequency components by the weight parameter determined based on the evaluation value SE and the weight parameter determined based on the evaluation value DE to combine the respective frequency components. With this configuration, the mapping image is smoothed.

Subsequently, the display control section 118 performs control for displaying the smoothed mapping image on the display section 122 (Step S114). With this configuration, the smoothed mapping image is displayed on the display section 122.

The order of processing steps of the image processing method according to the first embodiment is not limited to the order illustrated in FIG. 8. For example, the evaluation value SE may be obtained by the processing of Step S100, Step S102, Step S104, and Step S106 after the degree of smoothing is determined from the evaluation value DE by the processing of Step S108 and Step S110.

The image processing apparatus 100 according to the first embodiment has, for example, the following features.

In the image processing apparatus 100, the smoothing condition determination section 114 multiplies the amplitude H (difference between the maximum value and the minimum value of the X-ray intensity data within the mapping image) by the coefficient C of variation, and determines the degree of smoothing based on the result of the multiplication (that is, the evaluation value SE). The smoothing condition determination section 114 further calculates the size of the analysis area, and determines the degree of smoothing based on the size of the analysis area (that is, the evaluation value DE). The smoothing processing section 116 performs the smoothing processing on the mapping image based on the degree of smoothing determined based on the result of the multiplication and the degree of smoothing determined based on the size of the analysis area. Therefore, according to the image processing apparatus 100, it is possible to automatically determine the degree of smoothing to be used for the smoothing processing on the mapping image based on the image quality of the mapping image (mapping image that has not been subjected to the image processing) and the analytical conditions for acquiring the mapping image, and it is not necessary for the user to determine the degree of smoothing, which can improve the appearance of the mapping image with ease.

In addition, the image processing apparatus 100 allows errors corresponding to statistical variations during measurement of an X-ray to be kept within one color tone when the smoothing condition determination section 114 determines the degree of smoothing based on the amplitude H (difference between the maximum value and the minimum value of the X-ray intensity data within the mapping image). Therefore, it is possible to obtain a smooth mapping image having a satisfactory appearance.

Further, the image processing apparatus 100 can collectively perform the smoothing processing on even a plurality of mapping images having different image quality because the smoothing condition determination section 114 determines the degree of smoothing in the above-mentioned manner.

Figure 9:
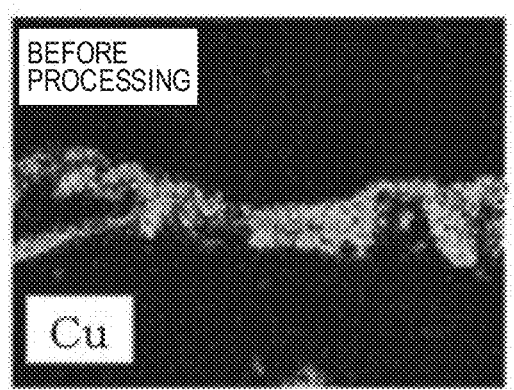
FIG. 9 is a diagram for illustrating a mapping image obtained before the smoothing processing.
Figure 10:
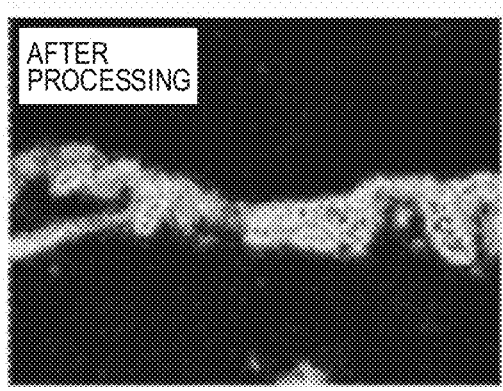
FIG. 10 is a diagram for illustrating the mapping image obtained after the smoothing processing is performed by an image processing method according to the first embodiment.
Figure 11:
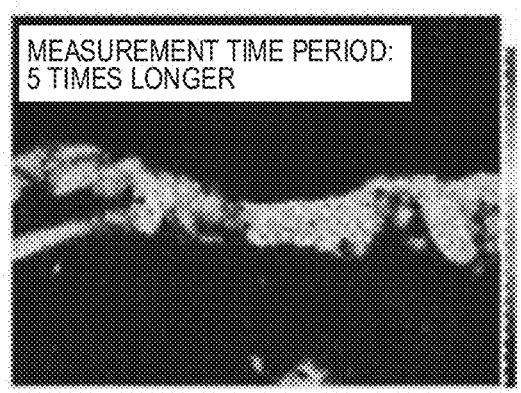
FIG. 11 is a diagram for illustrating the mapping image acquired over a measurement time period that is five times longer than a measurement time period for the mapping image illustrated in FIG. 9.

FIG. 9 is a diagram for illustrating the mapping image obtained before the smoothing processing. FIG. 10 is a diagram for illustrating the mapping image obtained after the smoothing processing is performed by the image processing method according to the first embodiment. FIG. 11 is a diagram for illustrating the mapping image acquired over a measurement time period that is five times longer than a measurement time period for the mapping image illustrated in FIG. 9.

As illustrated in FIG. 10 and FIG. 11, the smoothing processing is performed on the mapping image by the image processing method according to the first embodiment, to thereby be able to obtain an image having image quality equivalent to that of the mapping image acquired over the measurement time period that is five times longer.

2. Second Embodiment 2.1. Configuration

Next, an image processing apparatus according to a second embodiment of the present invention is described. The image processing apparatus according to the second embodiment has the same configuration as that of the image processing apparatus 100 illustrated in FIG. 1, and a description and an illustration thereof are omitted.

2.2. Image Processing Method

Next, the image processing method (smoothing processing) performed by the image processing apparatus according to the second embodiment is described. The image processing apparatus 100 according to the first embodiment uses the wavelet transform to perform the smoothing processing, while the image processing apparatus 100 according to the second embodiment uses the moving average (moving average filter) to perform the smoothing processing.

First, the method for the smoothing processing performed by the image processing apparatus 100 according to the second embodiment is described.

The image processing apparatus 100 according to the second embodiment performs the smoothing processing on the mapping image through use of the moving average filter. The smoothing processing using the moving average filter is processing for replacing the X-ray intensity of each pixel by an average value of the X-ray intensities of its surrounding pixels. The degree of smoothing to be used for the smoothing processing using the moving average filter is expressed as a filter size D (range of the surrounding pixels). The filter size D represents a length of one side of the filter. When the filter has a size of (3 pixels)×(3 pixels), the filter size D is 3 pixels.

In this case, when the filter size D is set to have units of pixels, the number of pixels to be smoothed is proportional to the square of the filter size D. Assuming that a signal amount is proportional to the number $D^2$ of pixels, a ratio of the statistical variations to the signal amount is 1/D.

When the ratio of the statistical variations to the signal amount of the image is limited to a value equal to or smaller than a fixed value with respect to the amplitude H of the image, a satisfactory image is obtained after the smoothing processing. Therefore, when a minimum value Dh of the filter size D that satisfies Expression (c) is set to a filter size to be used for the moving average filter (that is, when the moving average filter is set to have a size of (Dh pixels)×(Dh pixels)), the smoothing processing can be optimized.

$$A > \frac{1}{D} \times \frac{1}{\sqrt{H}} \quad \text{(c)}$$

$$D > \frac{1}{A\sqrt{H}}$$

In Expression (c), A represents a constant.

Expression (c) is derived by taking only the amplitude H of the image into consideration, but the coefficient C of variation of the image may be taken into consideration. In this case, when a minimum value Dhc of the filter size D that satisfies Expression (d) is set to the filter size to be used for the moving average filter (that is, when the moving average filter has a size of (Dhc pixels)×(Dhc pixels)), the smoothing processing can be optimized.

$$D > \frac{1}{A\sqrt{H \times C}} \quad \text{(d)}$$

In addition to the evaluation value used for evaluating the image quality of the original image using Expression (c) or Expression (d), the evaluation value corresponding to the size of the analysis area is used as the evaluation value for determining the degree of smoothing.

Specifically, a size Dx of the analysis area is converted into a function through use of a constant B, and the smoothing processing is performed with a range of the size Dx of the analysis area being used as a filter.

$$Dx = B \times (Z + \sqrt{d^2 + S^2}) \quad \text{(e)}$$

As indicated by Expression (e), the filter size becomes smaller (that is, the degree of smoothing becomes smaller) as the size Dx of the analysis area becomes smaller.

Next, processing performed by the processing section 110 of the image processing apparatus 100 according to the second embodiment is described.

Figure 12:
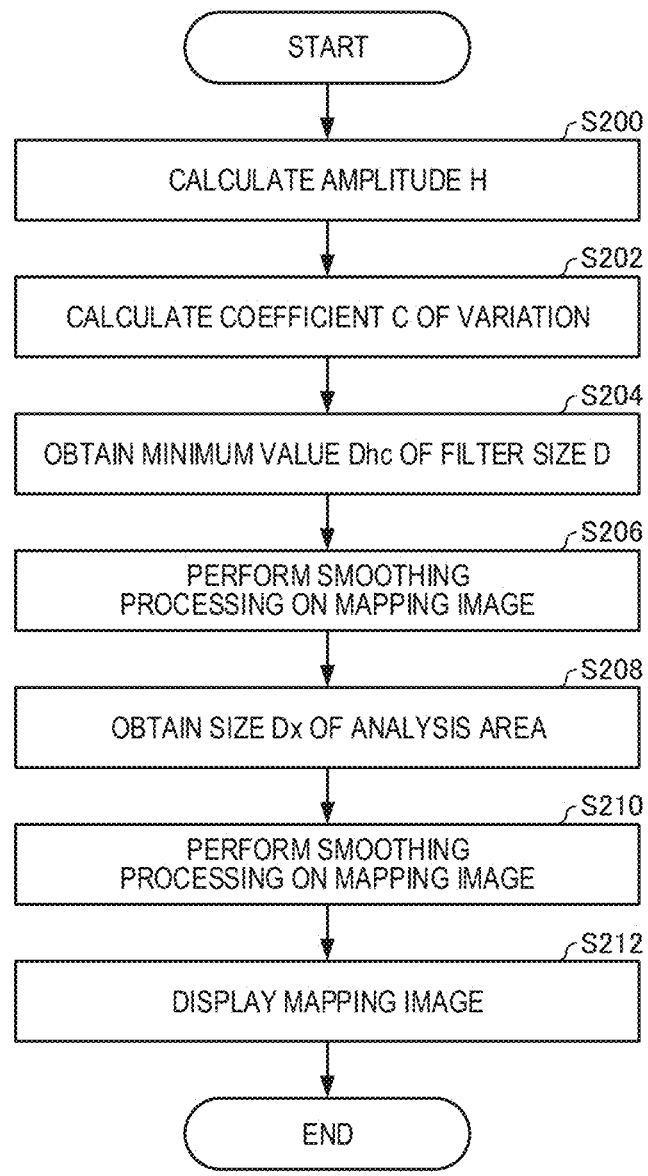
FIG. 12 is a flowchart for illustrating an example of processing performed by a processing section of an image processing apparatus according to a second embodiment of the present invention.

FIG. 12 is a flowchart for illustrating an example of the processing performed by the processing section 110 of the image processing apparatus 100 according to the second embodiment. The processing described below is performed in consideration of the coefficient C of variation of the image.

The image processing apparatus 100 acquires the mapping image (X-ray intensity map data).

First, the smoothing condition determination section 114 extracts the maximum value and the minimum value from the X-ray intensity data on all the pixels of the mapping image, and calculates the difference between the maximum value and the minimum value that have been extracted to obtain the amplitude H (Step S200).

Subsequently, the smoothing condition determination section 114 calculates the coefficient C of variation for the X-ray intensity data on all the pixels of the mapping image (Step S202).

Subsequently, the smoothing condition determination section 114 substitutes the calculated amplitude H and the calculated coefficient C of variation into Expression (d) to obtain the minimum value Dhc of the filter size D that satisfies Expression (d) (Step S204). Information on the constant A of Expression (d) is recorded in the storage section 124 in advance.

Subsequently, the smoothing processing section 116 performs the smoothing processing on the mapping image through use of the moving average filter having a filter size of the minimum value Dhc (Step S206).

Subsequently, the smoothing condition determination section 114 obtains the size Dx of the analysis area (Step S208). Specifically, the smoothing condition determination section 114 acquires the analytical conditions (apparatus conditions) for acquiring the mapping image and the information on the material of the specimen to be analyzed, and obtains the size Dx of the analysis area through use of Expression (e). The analytical conditions and the information on the material of the specimen to be analyzed are stored in the storage section 124 in advance, and the smoothing condition determination section 114 reads those pieces of information stored in the storage section 124 to acquire the information.

Subsequently, the smoothing processing section 116 performs the smoothing processing on the mapping image through use of the moving average filter for the range of the size Dx of the analysis area (Step S210).

Subsequently, the display control section 118 performs control for displaying the smoothed mapping image on the display section 122 (Step S212). With this configuration, the smoothed mapping image is displayed on the display section 122.

The processing performed in consideration of the coefficient C of variation of the image is described above, but even processing performed when the coefficient C of variation of the image is not taken into consideration is the same as the above-mentioned processing except that the processing (Step S202) for calculating the coefficient C of variation is not performed and Expression (c) is used to obtain the minimum value Dh of the filter size D in Step S204, and a description thereof is omitted.

The example of using the moving average filter as a method for smoothing is described above, but the method for smoothing is not limited to the moving average filter. For example, a Gaussian filter may be used as the method for smoothing. Even when the Gaussian filter is used as the method for smoothing, the mapping image can be smoothed by the same processing as that of the above-mentioned moving average filter.

The order of processing steps of the image processing method according to the second embodiment is not limited to the order illustrated in FIG. 12. For example, the mapping image may be subjected to the smoothing processing by the processing of Step S200, Step S202, Step S204, and Step S206 after the smoothing processing is performed on the mapping image by the processing of Step S208 and Step S210.

The image processing apparatus 100 according to the second embodiment has, for example, the following features.

In the image processing apparatus 100 according to the second embodiment, the smoothing condition determination section 114 calculates the minimum value of the filter size D that satisfies Expression (c) or Expression (d), and the smoothing processing section 116 performs the smoothing processing through use of the moving average filter or the Gaussian filter using the calculated minimum value as the filter size. In addition, the smoothing condition determination section 114 calculates the size Dx of the analysis area, determines the degree of smoothing based on the size Dx of the analysis area, and performs the smoothing processing on the mapping image through use of the moving average filter for the range of the size Dx of the analysis area. Therefore, with the image processing apparatus 100 according to the second embodiment, the degree of smoothing to be used for the smoothing processing on the mapping image can be automatically determined in the same manner as in the first embodiment, and it is not necessary for the user to determine the degree of smoothing, which can improve the appearance of the mapping image with ease.

3. Modification Example

The present invention is not limited to the above-mentioned embodiments, and may be modified and embodied in various ways within the gist of the present invention.

3.1. First Modification Example

In the first embodiment, the degree of smoothing to be used for the smoothing processing is determined through use of the evaluation value SE and the evaluation value DE, but may be determined through use of only the evaluation value SE. The evaluation value SE is obtained as a result of multiplying the amplitude H of the signal by the coefficient C of variation, but the degree of the smoothing processing may be determined through use of only the amplitude H.

That is, in this modification example, the smoothing condition determination section 114 calculates the difference (that is, the amplitude H) between the maximum value and the minimum value of the X-ray intensity data within the mapping image, and determines the degree of smoothing to be used for the smoothing processing on the mapping image based on the difference, and the smoothing processing section 116 performs the smoothing processing on the mapping image based on the degree of smoothing determined by the smoothing condition determination section 114. With this configuration, it is possible to automatically determine the degree of smoothing to be used for the smoothing processing on the mapping image. In addition, for example, the errors corresponding to the statistical variations during the measurement of the X-ray can be kept within one color tone, and it is possible to obtain a smooth mapping image having a satisfactory appearance.

Further, in the second embodiment, the smoothing condition determination section 114 determines the degree of smoothing to be used for the smoothing processing through use of the minimum value of the filter size D that satisfies Expression (c) or Expression (d) and the size Dx of the analysis area, but may determine the degree of smoothing through use of only the minimum value of the filter size D that satisfies Expression (c) or Expression (d). In this case, in the same manner as described above, it is possible to automatically determine the degree of smoothing, and also possible to keep the errors corresponding to the statistical variations during the measurement of the X-ray within one color tone.

3.2. Second Modification Example

In the first embodiment, the degree of smoothing to be used for the smoothing processing is determined through use of the evaluation value SE and the evaluation value DE, but an effect of the smoothing using the evaluation value DE is smaller than an effect of the smoothing using the evaluation value SE, and hence the expression for obtaining the evaluation value DE may be set as an approximate expression obtained by simplifying Expression (b).

3.3. Third Modification Example

In the first embodiment, the evaluation value SE is obtained as a result of multiplying the amplitude H of the signal by the coefficient C of variation (see Expression (a)). In this case, the coefficient C of variation represents an index for expressing a magnitude of variations in X-ray intensity data within the mapping image. A dispersion, a standard deviation, or the like is conceivable as the index for expressing the magnitude of variations in X-ray intensity data in the same manner as the coefficient C of variation. Therefore, the evaluation value SE is not limited to a value determined based on the amplitude H of the signal and the coefficient C of variation, and may be an evaluation value determined based on the amplitude H of the signal and the magnitude of variations (dispersion, standard deviation, or the like) in X-ray intensity data.

Also in the second embodiment, the dispersion, the standard deviation, or the like may be used as the index for expressing the magnitude of variations in X-ray intensity data instead of the coefficient C of variation included in Expression (d).

3.4. Fourth Modification Example

The example in which the analyzer 1000 is an electron probe microanalyzer (EPMA) is described above, but analyzers according to embodiments of the present invention is not limited to the EPMA, and may be, for example, a scanning electron microscope mounted with an EDS detector or a WDS detector (SEM-EDS or SEM-WDS), the scanning transmission electron microscope mounted with an EDS detector or a WDS detector (TEM-EDS or TEM-WDS), or an Auger electron microscope. When an analyzer according to one embodiment of the present invention is the EPMA or the electron microscope mounted with an EDS detector or a WDS detector, the signal emitted from the specimen is an X-ray. When an analyzer according to one embodiment of the present invention is the Auger electron microscope, the signal emitted from the specimen is an Auger electron.

The embodiments and the modification examples described above are merely examples, and the present invention is not limited thereto. For example, the respective embodiments and the respective modification examples may be combined appropriately.

The present invention includes configurations substantially the same as the configurations described above in connection with the embodiments (e.g., a configuration having the same function, method, and results, or a configuration having the same object and effects). The present invention also includes a configuration in which an unsubstantial element described above in connection with the embodiments is replaced by another element. The present invention also includes a configuration having the same actions and effects as those of the configurations described above in connection with the embodiments, or a configuration capable of achieving the same object as that of the configurations described above in connection with the embodiments. The present invention further includes a configuration in which a known technology is added to the configurations described in connection with the embodiments.

Although only some embodiments of the present invention have been described in detail above, those skilled in the art would readily appreciate that many modifications are possible in the embodiments without materially departing from the novel teachings and effects of the present invention. Accordingly, all such modifications are intended to be included within the scope of the present invention.

What is claimed is:

1. An image processing apparatus, which is configured to perform smoothing processing on a mapping image obtained by detecting a characteristic X-ray emitted from one of a plurality of analysis areas of a specimen, the image processing apparatus comprising:
a memory; and
a processor configured to execute a program stored in the memory to perform:
processing for generating the mapping image based on X-ray intensity map data, wherein the mapping image comprises an image including X-ray intensity information for each of a plurality of pixels that form the mapping image;
processing for calculating a difference between a maximum value and a minimum value of X-ray intensity information of the plurality of pixels within the mapping image, and determining a degree of smoothing to be used for the smoothing processing based on the difference; and
processing for performing the smoothing processing based on the determined degree of smoothing; and
wherein the processing for determining the degree of smoothing comprises processing for calculating a magnitude of variations in the X-ray intensity information within the mapping image, and determining the degree of smoothing based on the difference and the magnitude of variations in the X-ray intensity information; and
wherein the magnitude of variations in the X-ray intensity information is a magnitude of a coefficient of variation in the X-ray intensity information.

2. The image processing apparatus as defined in claim 1, wherein the processing for performing the smoothing processing comprises processing for performing the smoothing processing through use of a wavelet transform.

3. The image processing apparatus as defined in claim 1, wherein:
the processing for determining the degree of smoothing comprises processing for calculating a size of one of the analysis areas, and determining the degree of smoothing based on the size of one of the analysis areas; and
the processing for performing the smoothing processing comprises processing for performing the smoothing processing based on the degree of smoothing determined based on the difference and the degree of smoothing determined based on the size of one of the analysis areas.

4. The image processing apparatus as defined in claim 1, wherein:
the characteristic X-ray is detected by one of a wavelength-dispersive X-ray detector and an energy-dispersive X-ray detector.

5. An analyzer comprising the image processing apparatus of claim 1.

6. An image processing apparatus, which is configured to perform smoothing processing on a mapping image obtained by detecting a signal emitted from one of a plurality of analysis areas of a specimen, the image processing apparatus comprising:
a memory; and
a processor configured to execute a program stored in the memory to perform:
processing for calculating a difference between a maximum value and a minimum value of signal intensity data being intensity information on the signal of one of pixels within the mapping image, and determining a degree of smoothing to be used for the smoothing processing based on the difference; and
processing for performing the smoothing processing based on the determined degree of smoothing;
the processing for determining the degree of smoothing comprises processing for calculating a minimum value of a filter size D that satisfies the following expression:

$$D > \frac{1}{A\sqrt{H}}$$

where A represents a given constant, and H represents the difference between the maximum value and the minimum value of the signal intensity data; and the processing for performing the smoothing processing comprises processing for performing the smoothing processing through use of one of a moving average filter and a Gaussian filter that use the minimum value of the filter size D as a filter size.

7. An image processing apparatus, which is configured to perform smoothing processing on a mapping image obtained by detecting a signal emitted from one of a plurality of analysis areas of a specimen, the image processing apparatus comprising:
  a memory; and
  a processor configured to execute a program stored in the memory to perform:
  processing for calculating a difference between a maximum value and a minimum value of signal intensity data being intensity information on the signal of one of pixels within the mapping image, and determining a degree of smoothing to be used for the smoothing processing based on the difference; and
  processing for performing the smoothing processing based on the determined degree of smoothing;
  the processing for determining the degree of smoothing comprises processing for calculating a minimum value of a filter size D that satisfies the following expression:

$$D > \frac{1}{A\sqrt{H \times C}}$$

where A represents a given constant, H represents the difference between the maximum value and the minimum value of the signal intensity data, and C represents a coefficient of variation in the signal intensity data; and
  the processing for performing the smoothing processing comprises processing for performing the smoothing processing through use of one of a moving average filter and a Gaussian filter that use the minimum value of the filter size D as a filter size.

8. An image processing apparatus, which is configured to perform smoothing processing on a mapping image obtained by detecting a signal emitted from one of a plurality of analysis areas of a specimen, the image processing apparatus comprising:
  a memory; and
  a processor configured to execute a program stored in the memory to perform:
  processing for calculating a difference between a maximum value and a minimum value of signal intensity data being intensity information on the signal of one of pixels within the mapping image, and determining a degree of smoothing to be used for the smoothing processing based on the difference; and
  processing for performing the smoothing processing based on the determined degree of smoothing;
  the processing for determining the degree of smoothing comprises processing for calculating a size of one of the analysis areas, and determining the degree of smoothing based on the size of one of the analysis areas; and
  the processing for performing the smoothing processing comprises processing for performing the smoothing processing based on the degree of smoothing determined based on the difference and the degree of smoothing determined based on the size of one of the analysis areas;
  wherein the processing for determining the degree of smoothing comprises processing for calculating the size one of the analysis areas through use of the following expression:

$$DE = Z + \sqrt{d^2 + s^2}$$

where DE represents the size of one of the analysis areas, Z represents a size of a generation area of the signal, d represents a diameter of a probe for causing the signal to be generated from the generation area, and S represents a size of the mapping image per pixel.

9. An image processing method for performing smoothing processing on a mapping image obtained by detecting a characteristic X-ray emitted from one of a plurality of analysis areas of a specimen, the image processing method comprising:
  generating the mapping image based on X-ray intensity map data, wherein the mapping image comprises an image including X-ray intensity information for each of a plurality of pixels that form the mapping image;
  calculating a difference between a maximum value and a minimum value of X-ray intensity information of the plurality of pixels within the mapping image, and determining a degree of smoothing to be used for the smoothing processing based on the difference; and
  performing the smoothing processing based on the determined degree of smoothing; and
  wherein determining the degree of smoothing comprises calculating a magnitude of variations in the X-ray intensity information within the mapping image, and determining the degree of smoothing based on the difference and the magnitude of variations in the X-ray intensity information; and
  wherein the magnitude of variations in the X-ray intensity information is a magnitude of a coefficient of variation in the X-ray intensity information.

* * * * *

UNITED STATES PATENT AND TRADEMARK OFFICE
CERTIFICATE OF CORRECTION

PATENT NO. : 10,482,579 B2  
APPLICATION NO. : 15/673825  
DATED : November 19, 2019  
INVENTOR(S) : Norihisa Mori et al.

Page 1 of 1

It is certified that error appears in the above-identified patent and that said Letters Patent is hereby corrected as shown below:

In the Claims

Column 20, Line 20, Claim 8, delete "$DE = Z + \sqrt{d^2 + s^2}$" and insert --$DE = Z + \sqrt{d^2 + S^2}$--

Signed and Sealed this  
Third Day of March, 2020

Andrei Iancu  
*Director of the United States Patent and Trademark Office*